United States Patent [19]

Storey

[11] Patent Number: 5,530,772

[45] Date of Patent: Jun. 25, 1996

[54] APPARATUS AND METHOD FOR TESTING BANK NOTES FOR GENUINENESS USING FOURIER TRANSFORM ANALYSIS

[75] Inventor: Brian E. Storey, Dundee, Scotland

[73] Assignee: AT&T Global Information Solutions Company, Dayton, Ohio

[21] Appl. No.: 360,479

[22] Filed: Dec. 21, 1994

[30] Foreign Application Priority Data

Jul. 4, 1994 [GB] United Kingdom ............... 9413413

[51] Int. Cl.[6] .................................................. G06K 9/00
[52] U.S. Cl. .............................. 382/135; 382/280; 356/71
[58] Field of Search ................................. 382/135, 137, 382/209, 218, 280; 348/150, 161; 356/71; 209/534

[56] References Cited

U.S. PATENT DOCUMENTS

| | | | |
|---|---|---|---|
| 4,454,610 | 6/1984 | Sziklai | 382/3 |
| 4,817,176 | 3/1989 | Marshall et al. | 382/43 |
| 4,843,631 | 6/1989 | Steinpichler et al. | 382/43 |
| 4,881,270 | 11/1989 | Knecht et al. | 382/17 |
| 5,175,775 | 12/1992 | Iwaki et al. | 382/31 |

FOREIGN PATENT DOCUMENTS

| | | | |
|---|---|---|---|
| 0440142 | 8/1991 | European Pat. Off. | G07D 7/00 |
| 0537513 | 4/1993 | European Pat. Off. | G07D 7/00 |
| 1575607 | 9/1980 | United Kingdom | 356/71 |

OTHER PUBLICATIONS

English Abstract for NL 9201701, Derwent Publications Ltd., Abstract No. 94–174353.

*Primary Examiner*—Leo Boudreau
*Assistant Examiner*—Andrew W. Johns
*Attorney, Agent, or Firm*—James M. Stover

[57] ABSTRACT

In apparatus for detecting counterfeit bank-notes, an electronic camera forms a digital representation of a small area of the bank-note. The digital image is stored in an image memory. The Fourier transform of the digital image is then computed and analyzed to determine if it contains high spatial frequency components, and if so, the note is identified as counterfeit. The analyzer may use pattern recognition techniques. In a modification, Fourier transforms of a plurality of small areas are formed and averaged and the average is analyzed. This invention is particularly suitable for identifying counterfeit bank-notes having regular patterns e.g. of lines or dots, therein, such as are produced by color photocopiers or offset lithography printing.

7 Claims, 2 Drawing Sheets

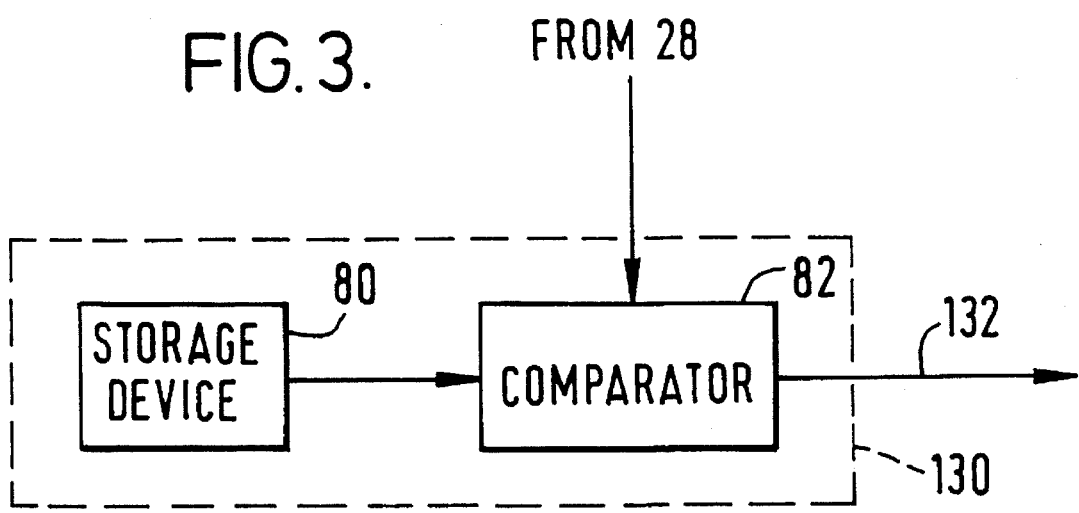
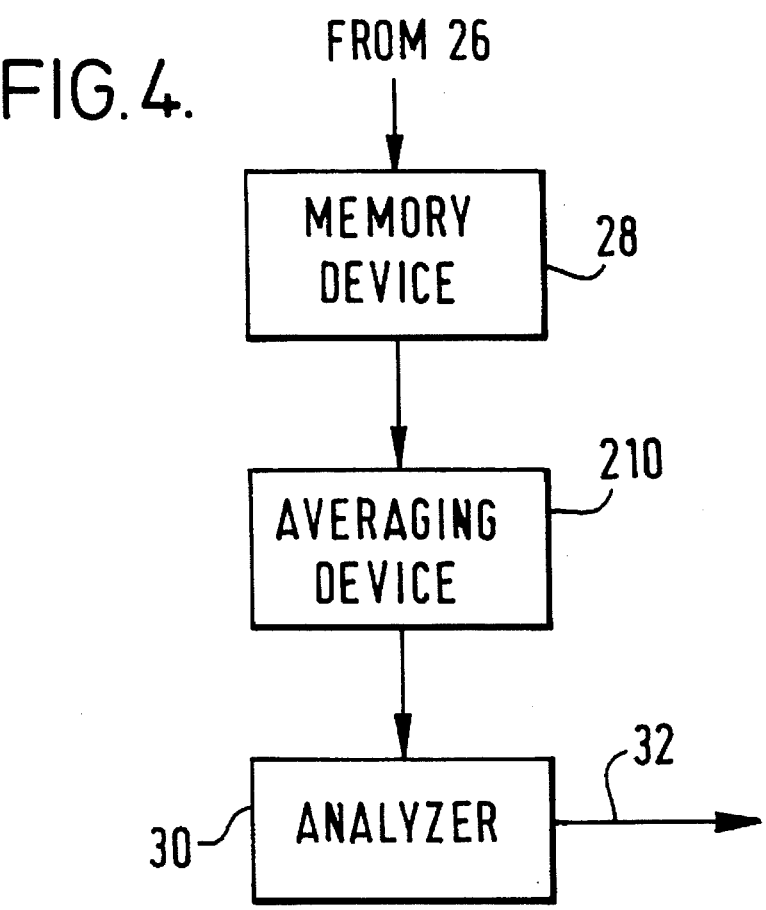

APPARATUS AND METHOD FOR TESTING BANK NOTES FOR GENUINENESS USING FOURIER TRANSFORM ANALYSIS

This invention relates to apparatus for testing bank-notes. The invention also relates to a method for testing bank-notes.

BACKGROUND OF THE INVENTION

Various techniques are known for testing the authenticity of bank-notes. It should be understood that the term "bank-note" used herein is to be taken to include currency bills and other valuable documents such as traveler's checks, for example. Typically, such techniques involve analyzing the color response of light which may be reflected from a bank-note being tested, to determine whether there is a sufficient degree of correspondence with the color response of a genuine bank-note.

However, the range of colors acceptable for bank-notes is limited. Also, color photocopiers may be used to produce counterfeit bank-notes, and the pigments used in such color photocopiers are liable to change. Furthermore, bank-notes which have been in use for some time may become dirty or stained in various ways, such that their color properties are altered. Such testing techniques, based on color response, therefore have the disadvantage of unduly limited reliability.

OBJECT OF THE INVENTION

It is an object of the present invention to provide a method and apparatus for testing bank-notes which alleviates the above-discussed disadvantage.

SUMMARY OF THE INVENTION

Therefore, according to one aspect of the present invention, there is provided apparatus for testing bank-notes for genuineness which includes image forming means adapted to form a digital image of an area on a bank-note; processing means adapted to compute a Fourier transform of said digital image; and analyzing means adapted to analyze said Fourier transform and identify the bank-note being tested as genuine or non-genuine in dependence on the result of the analysis.

According to another aspect of the present invention, there is provided a method of testing a bank-note for genuineness including the steps of: forming a digital image of an area on said bank-note, computing a Fourier transform of the digital image; and analyzing the Fourier transform to identify a bank-note as genuine or non-genuine depending on the result of the analysis.

It will be appreciated that the apparatus and method for testing bank-notes, according to the invention, have the advantage of avoiding the use of color response analysis, by virtue of the specified Fourier transform feature. As will be explained in more detail hereinafter, the apparatus and method according to the invention are particularly effective for identifying counterfeit notes produced by commonly used reproduction techniques such as color photocopiers or offset lithography printing.

The above and other objects, features, and advantages of the present invention will become apparent from the following description and the attached drawings.

BRIEF DESCRIPTION OF THE DRAWINGS

FIG. 3 is a block diagram of a modification of a portion of the apparatus shown in FIG. 1; and FIG. 4 is a block diagram of another modification of a portion of the apparatus shown in FIG. 1.

DETAILED DESCRIPTION OF THE PREFERRED EMBODIMENT

Figure 1:
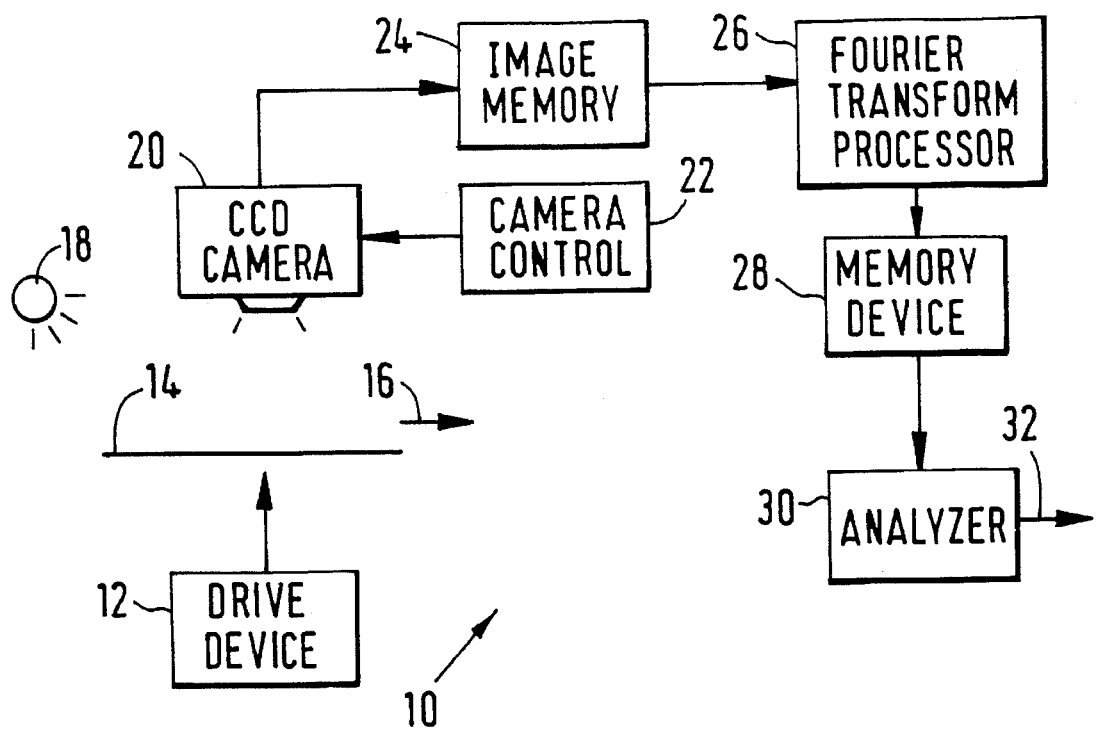
FIG. 1 is a simplified block diagram of apparatus according to the invention for detecting forged bank-notes.

Referring now to FIG. 1, there is shown a simplified block diagram of apparatus 10 according to the invention for testing the authenticity of bank-notes, sometimes referred to as currency bills. The apparatus 10 includes a drive device 12 arranged to feed a bank-note 14 to be tested in the direction of arrow 16. Light from a white light source 18 is directed towards the bank-note 14, which is fed past a CCD (change coupled device) camera 20 with which is associated a camera control unit 22. Although a CCD camera is used in the described embodiment, other types of electronic camera may be utilized. The camera control unit 22 causes the CCD camera 20 to image a selected small area, of the bank-note 14, typically a square area about 10–20 millimeters across. Preferably, the area selected has a high level of printing thereon, since it will be appreciated that areas with a low level of printing are less suitable for distinguishing forgeries from genuine notes. The camera 20 provides a digitized representation of the imaged area, which is fed to an image memory 24 for storage therein as a digital image. That is, each pixel is stored in the form of a binary number representing the brightness of the pixel as detected by the CCD camera 20.

The image memory 24 is connected to a Fourier transform processor 26 which forms the two-dimensional Fourier transform of the digital image stored in the image memory 24. The Fourier transform processor 26 may be a dedicated hardware digital logic device such as a Fast Fourier Transform (FFT) processor, or may be a suitably programmed microprocessor. The thus computed Fourier transform is stored in a memory device 28. The memory device 28 is connected to an analyzer 30 which analyzes the Fourier transform stored in the memory device 28 to determine whether or not the stored Fourier transform has features which identify the bank-note being tested as counterfeit. A signal representing the result of the analysis is provided on an output line 32.

Figure 2:
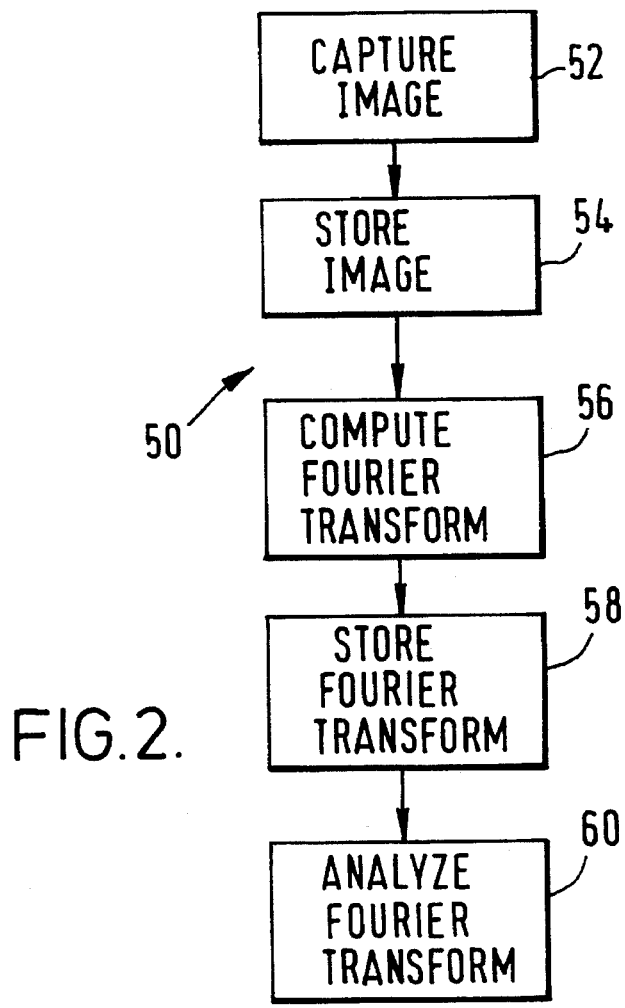
FIG. 2 is a flowchart illustrating the operation of the apparatus shown in FIG. 1.

Referring to FIG. 2 there is shown a flowchart 50 illustrating steps involved in the above described operation Of the apparatus 10 shown in FIG. 1. Firstly as shown in block 52, a digital image of an area of the bank-note 14 (FIG. 1 ) is captured by the CCD camera 20. The computed digital image is stored in the image memory as shown in block 54. Next, the two-dimensional Fourier transform of the stored digital image is computed (block 56) by the Fourier transform processor 26 and stored (block 58) in the memory device 28. Finally, Fourier transform analysis is performed (block 60) in the analyzer 30, as will now be explained in detail.

With regard to the operation of the analyzer 30, it should first be appreciated that there are, or course, many different procedures which may be used to produce counterfeit bank-notes. For example, one procedure is to use a color photocopier. It has been found that copies produced by color photocopiers have a regular pattern of closely spaced straight lines therein. The spacing of these lines is sufficiently small such that this pattern is not generally visible to the unaided eye. Another procedure which may be used to produce counterfeit bank-notes involves the use of offset lithography printing. In this connection, it should be understood that genuine bank-notes are generally produced by printing processes such as photogravure, rather than offset lithography printing. It has been found that offset lithography printing results in a counterfeit bank-note which has a regular pattern of closely spaced dots therein, which again is generally invisible to the unaided eye. The printing processes, such as photogravure, currently used for printing genuine bank-notes do not have any such closely spaced regular patterns that extend over the whole bank-note. Such localized patterns as do exist on genuine engraved bank-notes will have larger spacings than the features which are detected by the Fourier transform procedure described herein. The resolution of the digital image stored in the image memory 24 should be sufficiently high, to resolve the closely spaced lines or dots just discussed. Preferably, the pixel spacing in the captured digital image is less than or equal to one-half of the spacing of the regular dot-lines pattern. A resolution of around 100 microns is a typical value.

Computing the Fourier transform of the digital image stored in the image memory 24 has the effect of clearly revealing the spatial frequencies of regular patterns on the bank-note, particularly the features that are present in counterfeit notes produced by commonly used reproduction techniques as discussed hereinabove. If the bank-note 14 being tested has a regular closely spaced pattern thereon, such as lines or dots, then the Fourier transform pattern will have relatively high spatial frequency components therein. The more closely spaced the elements of the regular pattern are, the higher will be the spatial frequencies in the Fourier transform. That is, the further will the characteristic peaks in the transform be displaced from the center (corresponding to zero spatial frequency) of the Fourier transform pattern. The Fourier transform pattern may consist of one or more radial lines of spots, dependent on the nature of the regular pattern of lines or dots, etc., on the bank-note being tested.

The analyzer 30 is effective to determine whether or not high spatial frequency components, typically in the form of a radial line or lines of spots, extending outwards from the origin (central location), exists in the Fourier transform pattern stored in the memory 28. This is preferably achieved by a known pattern recognition technique. For example, the Fourier transform pattern can be tested for large signals or spots at an appropriately large distance from the origin.

In an alternative arrangement, FIG. 3, an analyzer 130 (corresponding to the analyzer 30) includes a storage device 80 which stores the Fourier transform of the same selected area on a genuine bank-note, as is formed by the camera 20 for a bank-note being tested. A comparator 82 compares the Fourier transform from the memory 28 with the Fourier transform of the genuine bank-note, from the storage device 80, to provide an output on a line 132 (corresponding to the line 32 in FIG. 1) if at least a predetermined difference exists, indicative of the bank-note 14 being tested being counterfeit.

FIG. 4 shows a portion of the apparatus shown in FIG. 1, modified in accordance with a further modified embodiment of the invention. In this modified embodiment an averaging device 210 is disposed between the Fourier transform memory 28 and the analyzer 30. The camera control unit 22 is arranged to cause the camera 20 to image successively a plurality of different small areas of the bank-note 14 being tested. The Fourier transforms for these areas are successively generated, stored in the memory 28, and sent to an averaging device 210, FIG. 4, which computes the average of the successively derived Fourier transforms. It will be appreciated that if the bank-note 14 has a regular pattern, such as lines or dots, thereon, as discussed hereinabove, then such pattern effectively accumulates during the averaging process, whereas the basic print pattern of the bank-note, which varies in frequency over the bank-note, averages out to a low level during the averaging process. This enables the analyzer 30 to more easily determine the presence of spatial frequency components of large amplitude since such components will be relatively strong as a result of the averaging process. It will be appreciated that the ease of operation of the analyzer 30 is enhanced, enabling a more accurate determination to be achieved by pattern recognition techniques, for example. In this connection, it will be appreciated that the large amplitude features that are detected are characteristic of the dot/line pattern created in the counterfeiting process as discussed hereinabove, and the Fourier transform of these features will be substantially constant over the entire note. On a genuine note, the features of the printing will vary with the area examined, and will generally be of lower amplitude and occur at lower spatial frequencies.

There has been described an effective and efficient arrangement for detecting counterfeit bank-notes, particularly where the nature of the counterfeit bank-note is such that a regular pattern, such as a pattern of lines or dots exists in the counterfeit note. The described apparatus will detect counterfeit notes produced by commonly used processes, such as color photocopying and offset lithography printing. However, it will be appreciated that there are other ways in which bank-notes may be forged, so that in a practical arrangement for authenticating bank-notes it may be desirable to include an additional testing device or devices operating on a different principle from that described herein.

The described apparatus may be incorporated in a bank-note recognition and validation apparatus into which bank-notes are fed by a user of the apparatus. Such apparatus will first recognize a bank-note, i.e. identify the type and denomination of the note. On the basis of the identified note type, a suitable area or areas thereon may be selected using the camera control unit 22 (FIG. 1) for example, for analysis by the Fourier transform procedure described herein.

As a further modification, instead of imaging a square area of the bank-note, a linear area, e.g. a line one pixel wide extending across the bank-note being tested could be imaged and a one-dimensional Fourier transform applied to the stored image instead of a two-dimensional Fourier transform. This has the advantage of requiring considerably less computing power, thereby resulting in cost and/or time savings, but the reliability of the apparatus may be reduced.

Although the presently preferred embodiment of the invention has been described, it will be understood that various changes may be made within the scope of the appended claims.

What is claimed is:

1. Apparatus for testing bank-notes for genuineness, comprising image forming means (20,22) for generating a digital image of an area on a bank-note (14);

processing means (26) connected to receive said digital image for computing a Fourier transform of said digital image; and analyzing means (30) connected to receive said Fourier transform for analyzing said Fourier transform to determine whether said bank note is a genuine bank note, said bank-note being identified as a non-genuine bank note if said Fourier transform contains high spatial frequency components.

2. Apparatus according to claim 1, wherein said analyzing means (30) includes:

comparison means (82) adapted to compare said Fourier transform with a Fourier transform derived from a genuine bank-note.

3. Apparatus according to claim 1, wherein:

said image forming means (20,22) generates a plurality of digital images corresponding to a plurality of areas on said bank-note (14); and said apparatus further comprising averaging means (210) connected between said processing means (26) and said analyzing means (30) for forming an average Fourier transform from the Fourier transforms of said plurality of digital images.

4. Apparatus according to claim 1, wherein:

said forming means (20,22) includes a CCD camera (20).

5. Apparatus for testing bank-notes for genuineness, comprising:

image forming means (20,22) for generating a plurality of digital images corresponding to a plurality of areas on a bank-note (14);

processing means (26) connected to receive said plurality of digital images for computing a Fourier transform of each one of said plurality of digital images;

averaging means (210) connected to receive said Fourier transforms for forming an average Fourier transform from the Fourier transforms of said plurality of digital images; and analyzing means (30) connected to receive said average Fourier transform for analyzing said average Fourier transform to determine whether said bank note is a genuine bank note.

6. A method of testing a bank-note for genuineness, comprising the steps of:

forming a digital image of an area on said bank-note;

computing a Fourier transform of the digital image; and analyzing the Fourier transform to determine whether said Fourier transform contains high spatial frequency components, said bank-note being identified as a non-genuine bank note if said Fourier transform contains high spatial frequency components.

7. A method of testing a bank-note for genuineness according to claim 6, wherein said step of analyzing the Fourier transform includes the step of:

comparing said Fourier transform with a Fourier transform derived from a genuine bank-note.

* * * * *